United States Patent
Wu et al.

(10) Patent No.: US 8,289,553 B2
(45) Date of Patent: Oct. 16, 2012

(54) PRINTING METHOD AND SYSTEM TO PRINT FILES FROM AN ELECTRONIC BOOK

(75) Inventors: Yi-Fang Wu, Taipei Hsien (TW); Yong-Hui Xiao, Shenzhen (CN); Ya-Bei Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 506 days.

(21) Appl. No.: 12/550,795

(22) Filed: Aug. 31, 2009

(65) Prior Publication Data

US 2010/0208288 A1    Aug. 19, 2010

(30) Foreign Application Priority Data

Feb. 17, 2009 (CN) .......................... 2009 1 0300456

(51) Int. Cl.
*G06F 3/12* (2006.01)

(52) U.S. Cl. .......................... 358/1.15; 347/109; 235/375
(58) Field of Classification Search ................ 358/1.15, 358/1.14; 710/220; 709/230, 250
See application file for complete search history.

(56) References Cited

U.S. PATENT DOCUMENTS

| | | | |
|---|---|---|---|
| 2007/0091346 A1* | 4/2007 | Ogura et al. ................. | 358/1.14 |
| 2008/0155152 A1* | 6/2008 | Keeney et al. ............... | 358/1.15 |
| 2009/0002760 A1* | 1/2009 | Chang et al. ................ | 358/1.15 |

* cited by examiner

*Primary Examiner* — Benny Q Tieu
*Assistant Examiner* — Juan Guillermety
(74) *Attorney, Agent, or Firm* — Altis Law Group, Inc.

(57) ABSTRACT

A printing method for printing a file stored in an e-book connecting the e-book and a printer to a network, where the e-book sends a message to find the printer. The printer responds to the broadcasting message to establish connection between the e-book and the printer. The method further includes sending a printing request to the printer by the e-book, and determining whether the file is a format which the printer can directly print. If the file is not a format can be identified by the printer, the e-book decodes the file to a format can be identified by the printer, and uploads to the printer. Then, the printer prints the decoded file.

16 Claims, 3 Drawing Sheets

PRINTING METHOD AND SYSTEM TO PRINT FILES FROM AN ELECTRONIC BOOK

BACKGROUND

1. Technical Field

The present disclosure relates to printing methods and systems, and more particularly, to a printing method and system to print files from an electronic book (e-book).

2. Description of Related Art

Nowadays, mobile electronic devices generally can store various files, such as pictures and text files. In order to print a document, a printer driver must be installed on a mobile electronic device. The printer driver corresponds to a first printer. However, if a user wants to print to a second printer, then a different printer driver corresponding to the second printer must be installed. This process must be repeated for the second printer, which is time-consuming and inconvenient.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
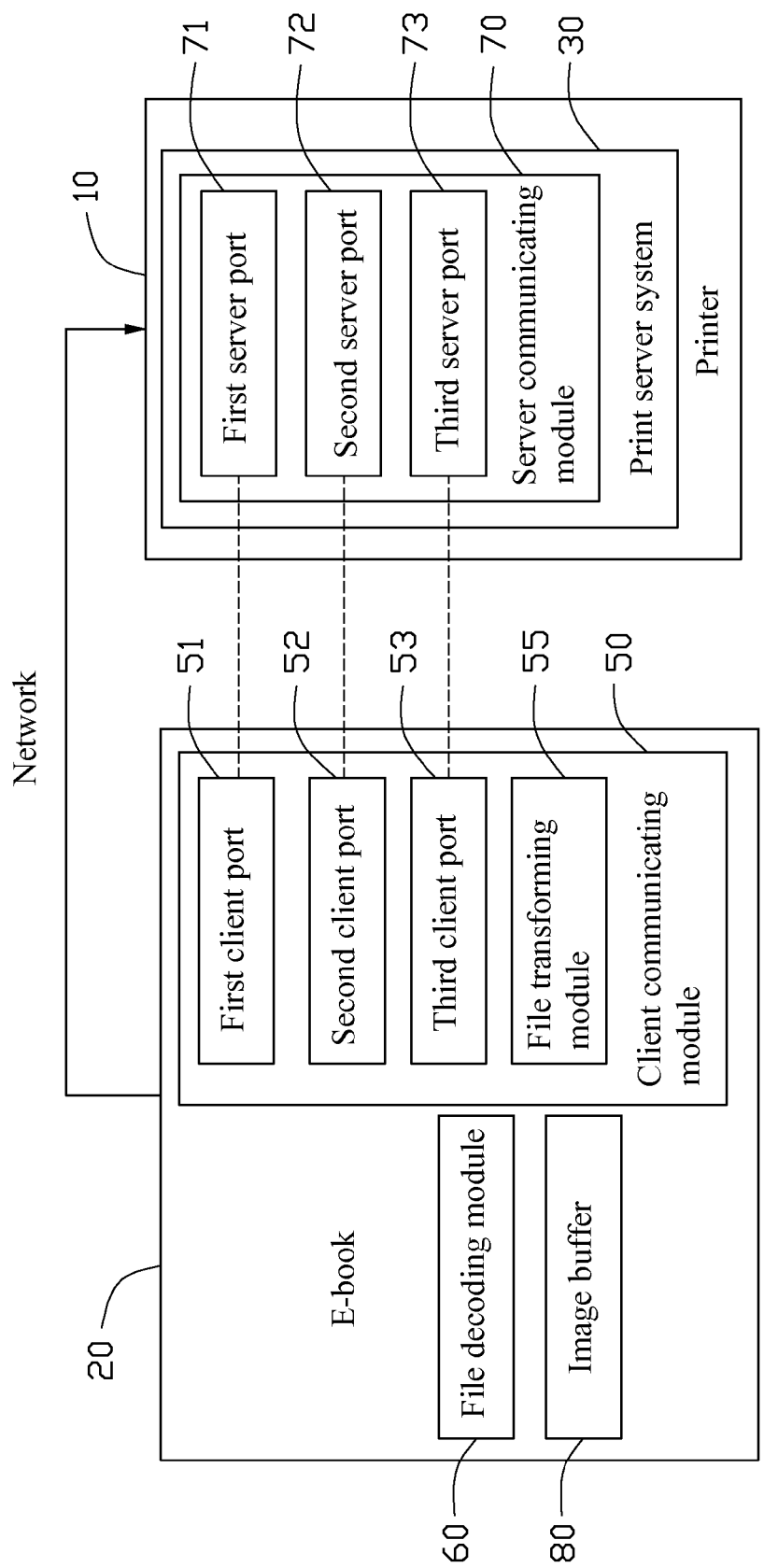
FIG. 1 is a block diagram of one embodiment of a printing system.
Figure 2:
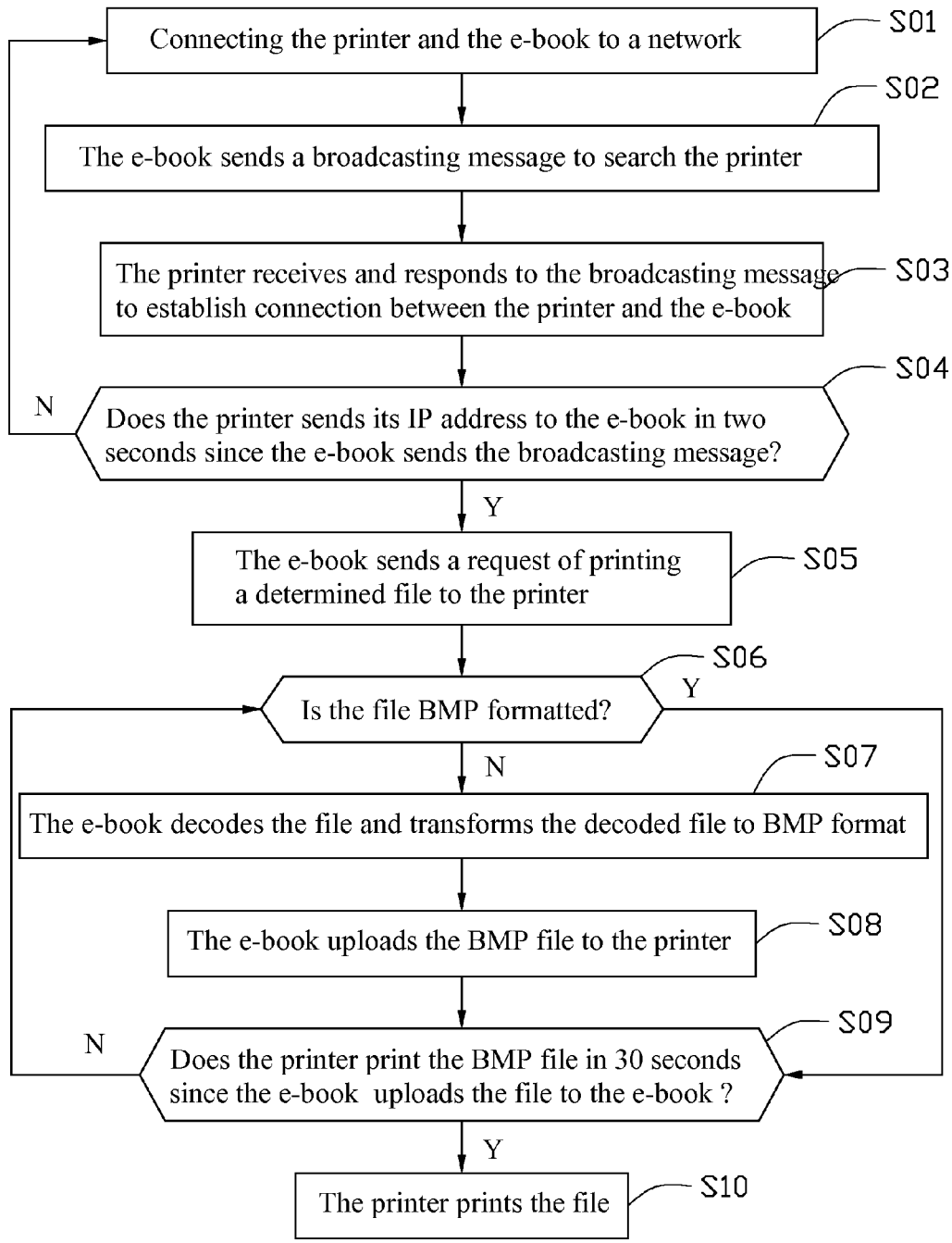
FIG. 2 is a flow chart of one embodiment of a printing method for using the printing system of FIG. 1.

Referring to FIG. 1, an embodiment of a printing system includes a printer 10 and a client terminal, for example, an e-book 20 capable of communicating with the printer 10 via a network. The network may be the Internet or a local area network. The printer 10 incorporates a print server system 30. The e-book 20 is capable of sending files to the printer 10 via the network.

The e-book 20 includes a client communicating module 50, a file decoding module 60, and an image buffer 80. The client communicating module 50 includes first to third client ports 51, 52, 53, and a file transforming module 55. The first client port 51 is configured to send a message to the print server system 30 to find the printer 10. The second client port 52 is configured to submit a print request and inquire the status of the printer 10. The third client port 53 is configured to upload files to the print server system 30. When a file stored in the e-book 20 is opened, the file decoding module 60 is capable of decoding contents of the file, and storing the decoded contents of the file in the image buffer 80 of the e-book 20. The file transforming module 55 is capable of reading the decoded contents and transforming them to a bitmap (BMP) formatted file which can be read by the printer 10.

The print server system 30 includes a server communicating module 70. The server communicating module 70 includes first to third ports 71, 72, 73. The first server port 71 is configured to respond to the message from the first client port 51 of the e-book 20 and send feedback to the first client port 51. The second server port 72 is configured to receive the print request and inquiry from the second client port 52. The third server port 73 is configured to receive the file uploaded by the third client port 53. The e-book 20 and the printer 10 communicate with each other via the client communicating module 50 and the server communicating module 70.

Figure 3:
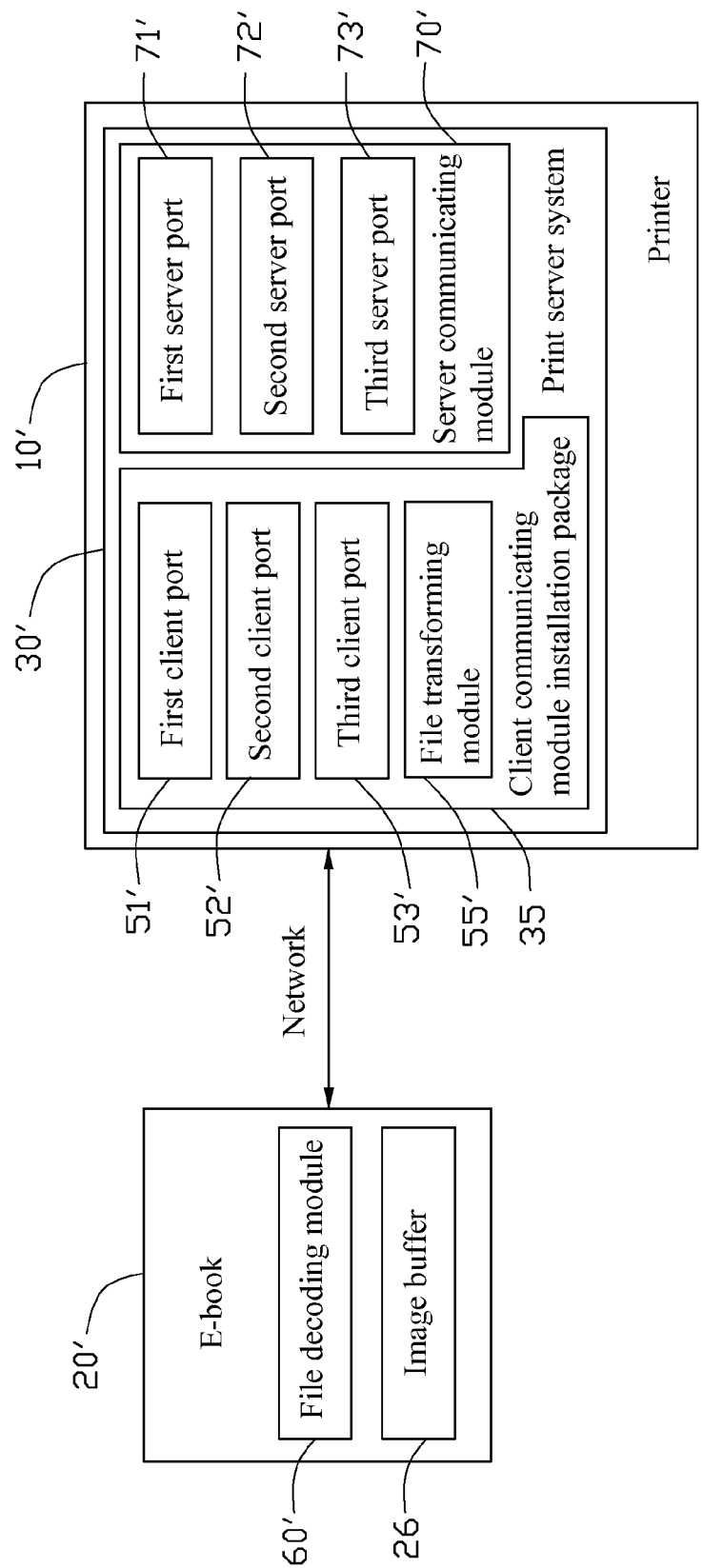
FIG. 3 is a block diagram of another embodiment of a printing system.

Referring to FIG. 3, the printing method is described in the following steps:

Step 01: Connecting the printer 10 and the e-book 20 to a network. The printer 10 gets an internet protocol (IP) address from the network.

Step 02: The e-book 20 sends a message to find the printer 10.

Step 03: The print server system 30 receives and responds to the message, thereby establishing connection between the printer 10 and the e-book 20.

Step 04: The e-book 20 determines whether the printer 10 has sent its IP address to the e-book 20 within a predetermined time period from when the e-book 20 sends the message. If the printer 10 sends its IP address to the e-book 20 within the predetermined time period the printing method goes to step 5. Otherwise, if the printer 10 has not send its IP address within the predetermined time period, the printing method goes back to step 2. In one embodiment, the predetermined time period may be two seconds.

Step 05: The e-book 20 sends a print file request to the printer 10.

Step 06: The e-book determines whether the file is in BMP format and therefore printable by the printer. If the file is in BMP format, the printing method goes to step 08; otherwise, the printing method goes to step 07.

Step 07: The e-book 20 decodes the file and transforms the decoded file to BMP format.

Step 08: The e-book 20 uploads the BMP formatted file to the printer 10.

Step 09: The e-book 20 determines whether the printer 10 is spooling the BMP formatted file within a predetermined time period since the e-book 20 uploaded the BMP formatted file to the e-book 20. If the printer 10 is spooling the BMP formatted file within the predetermined time period since the file was uploaded to the printer 30, the printing method goes to step 10; otherwise, the printing method goes back to step 05. In one embodiment, the predetermined time period may be 30 seconds.

Step 10: The printer 10 prints the file.

When printing a file by the above described print system and method, it is not necessary to install drivers corresponding to the printer 10 in the e-book 20. The e-book 20 can upload files for printing anytime and anywhere when a network connection is available. Thus, printing becomes convenient when a proper driver cannot be located.

Referring to FIG. 3, in another embodiment of the printing system, the e-book 20' comprises an Internet browser 26 and a file decoding module 60'. The printer 10' includes a server communicating module 70'. A client communicating module installation package 35 is stored in the print server 70' of the printer 10'. The e-book 20' is capable of accessing the print server 70' and downloading the client communicating module installation package 35 via the Internet browser 26. The downloaded client communicating module installation package 35 can be installed in the e-book 20' providing the e-book 20' with a first client port 51', a second client port 52', a third client port 53', and a file transforming module 55'. Thus, the e-book 20 can communicate with the printer 10'.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A printing method for printing a file stored in an electronic book (e-book), comprising:
   connecting the e-book and a printer to a network;
   sending a message by the e-book to find the printer via the network;
   responding to the message by the printer and establishing communication between the e-book and the printer;
   sending a request of printing the file to the printer by the e-book via the network;
   determining whether the file can be read by the printer, if the file can be read by the printer, uploading the file to the printer by the e-book; if the file cannot be read by the printer, decoding the file and transforming the decoded file to a format can be read by the printer, and uploading to the printer; and
   determining whether the printer is spooling the file within a first predetermined time period since the e-book uploads the file to the printer, the printer prints the file if the printer is spooling the file within the first predetermined time period; the e-book sends a request of printing the file to the printer if the printer is not spooling the file within the first predetermined time period.

2. The printing method of claim 1, wherein the printer sends back its internet protocol address to the e-book after the printer receives the message, so as to establish the connection between the printer and the e-book.

3. The printing method of claim 2, wherein the e-book sends another message to find the printer if the printer fails to send back its internet protocol address to the e-book within a second predetermined time period from when the e-book sends the broadcasting message firstly.

4. The printing method of claim 3, wherein the format file is a BMP format file.

5. The printing method of claim 3, wherein the second predetermined time period is 2 seconds.

6. The printing method of claim 1, further comprising the e-book accessing the printer via the network to download a client communicating module installation package to the e-book from the printer before the step of sending the message to search the printer.

7. The printing method of claim 1, wherein the first predetermined time period is 30 seconds.

8. A printing system, comprising:
   a printer;
   a mobile electronic device communicating with the printer via a network; and
   a file decoding module;
   wherein the mobile electronic device comprising a client communicating module, the client communicating module is adapted to send a file to the printer via the network and determine whether the printer is spooling the file within a first predetermined time period since the communicating module uploads a file to the printer; if the printer is spooling the file within the first predetermined time period, the mobile electronic device sends a request of printing the file to the printer; if the printer is not spooling the file within the first predetermined time period, the client communicating module sending the file to the printer again; and the file decoding module decodes the file if the file can not be read by the printer.

9. The printing system of claim 8, wherein the printer is adapted to send as internet protocol address of the printer to the mobile electronic device to communicate with the mobile electronic device.

10. The printing system of claim 8, wherein the printer comprises a client communication module installation package configured to be downloaded to the mobile electronic device after the mobile electronic device communicates with the printer.

11. The printing system of claim 10, wherein the mobile electronic device comprises an internet browser, and the mobile electronic device accesses the printer and downloads the client communication module installation package via the internet browser.

12. The printing system of claim 8, wherein the mobile electronic device further comprises a file transforming module and an image buffer; the file transforming module reads the decoded file and transforms the decoded file to a BMP formatted file; the printer is adapted to identify the BMP formatter file; and the image buffer is adapted to store the BMP formatted file.

13. The printing system of claim 8, wherein the mobile electronic device is an electronic book.

14. A mobile electronic device capable of communicating with a printer, comprising:
   a file decoding module; and
   a client communicating module;
   wherein the client communicating module is adapted to send a file to the printer and determine whether the file can be read by the printer after the client communicating module finds the printer; if the file can be read by the printer, the client communicating module uploads the file to the printer; and if the file cannot be read by the printer, the file decoding module decodes the file and transforms the decoded file to a format file, which can be read by the printer, and the client communicating module uploads the format file to the printer;
   the client communicating module is further adapted to determine whether the printer is spooling the file within a predetermined time period since the communicating module uploads the file to the printer; if the printer is spooling the file within the predetermined time period, the printer prints the file; if the printer is not spooling the file within the predetermined time period, the client communicating module sends the file to the printer again.

15. The mobile electronic device of claim 14, wherein the predetermined time period is 30 seconds.

16. The mobile electronic device of claim 14, further comprising an image buffer, wherein the format file is a BMP format file; the printer is adapted to identify the BMP forma file; and the imaged buffer is adapted to store the BMP format file.

* * * * *